(12) United States Patent
Hazama et al.

(10) Patent No.: US 11,820,570 B2
(45) Date of Patent: Nov. 21, 2023

(54) CONDUCTIVE SHEET AND EMBOSSED CARRIER TAPE

(71) Applicant: GOLD INDUSTRIES CO., LTD., Osaka (JP)

(72) Inventors: Toshimitsu Hazama, Miyazaki (JP); Taisei Murata, Osaka (JP)

(73) Assignee: GOLD INDUSTRIES CO., LTD., Osaka (JP)

( * ) Notice: Subject to any disclaimer, the term of this patent is extended or adjusted under 35 U.S.C. 154(b) by 803 days.

(21) Appl. No.: 16/961,571

(22) PCT Filed: Dec. 28, 2018

(86) PCT No.: PCT/JP2018/048487
§ 371 (c)(1),
(2) Date: Jul. 10, 2020

(87) PCT Pub. No.: WO2019/138941
PCT Pub. Date: Jul. 18, 2019

(65) Prior Publication Data
US 2020/0361682 A1    Nov. 19, 2020

(30) Foreign Application Priority Data

Jan. 15, 2018  (JP) ................... 2018-004576

(51) Int. Cl.
*B65D 73/02* (2006.01)
*B32B 7/025* (2019.01)
(Continued)

(52) U.S. Cl.
CPC .............. *B65D 73/02* (2013.01); *B32B 7/025* (2019.01); *B32B 27/18* (2013.01); *B32B 27/30* (2013.01);
(Continued)

(58) Field of Classification Search
CPC ........ B65D 73/02; B65D 65/40; B32B 7/025; B32B 27/18; B32B 27/30; C08K 3/04; C08L 25/06; C08L 25/10; C08L 51/04
(Continued)

(56) References Cited

U.S. PATENT DOCUMENTS 6,027,802 A * 2/2000 Lin ........................... C09J 7/30
428/355 R
2016/0325534 A1* 11/2016 Hu ......................... B32B 27/308
(Continued)

*Primary Examiner* — Jacob K Ackun
(74) *Attorney, Agent, or Firm* — Rankin, Hill & Clark LLP

(57) ABSTRACT

An object of the present invention is to provide a conductive sheet and an embossed carrier tape that can reduce detachment of carbon black and prevents deterioration of buckling strength. A conductive sheet for an embossed carrier tape for mounting an electronic component, in which the conductive sheet has a configuration in which a surface layer having conductivity is laminated on at least one surface of a core layer; the core layer and the surface layer each contain a common material constituted of only a combination of three types of polystyrene-based resins of styrene-butadiene copolymer resin, general purpose polystyrene resin, and high impact polystyrene resin; a common material constituting the core layer and a common material constituting the surface layer have the same compounding ratio; and the surface layer is formed by kneading carbon black in the common material.

4 Claims, 3 Drawing Sheets

Comparative result of carbon detachment (transfer)

[Checking method]
Rubbing a slit surface with a waste cloth and checking carbon transfer by a microscope

(51) Int. Cl.

| | |
|---|---|
| *B32B 27/18* | (2006.01) |
| *B32B 27/30* | (2006.01) |
| *B65D 65/40* | (2006.01) |
| *C08K 3/04* | (2006.01) |
| *C08L 25/06* | (2006.01) |
| *C08L 25/10* | (2006.01) |
| *C08L 51/04* | (2006.01) |

(52) U.S. Cl.
CPC ............... *B65D 65/40* (2013.01); *C08K 3/04* (2013.01); *C08L 25/06* (2013.01); *C08L 25/10* (2013.01); *C08L 51/04* (2013.01)

(58) Field of Classification Search
USPC .................................. 206/701, 713, 714, 716
See application file for complete search history.

(56) References Cited

U.S. PATENT DOCUMENTS

| | | | |
|---|---|---|---|
| 2017/0257990 A1* | 9/2017 | Ng | ......................... B65D 73/02 |
| 2019/0001644 A1* | 1/2019 | Nukada | .................... B32B 3/26 |
| 2020/0247099 A1* | 8/2020 | Atsusaka | ................ B32B 27/40 |
| 2021/0291499 A1* | 9/2021 | Langhe | ................ B32B 27/304 |
| 2021/0378156 A1* | 12/2021 | Li | ..................... H01L 21/67333 |

\* cited by examiner

Comparative result of carbon detachment (transfer)

[Checking method]
Rubbing a slit surface with a waste cloth and checking carbon transfer by a microscope Comparative result of opening state of hole for sprocket Comparative result of buckling strength

| Item | | Comparative Example 1 | Comparative Example 2 | Example 1 |
|---|---|---|---|---|
| Appearance | Front |  |  |  |
| | Back |  |  |  |
| Buckling strength | kg | 1.43 | 1.27 | 1.51 |

CONDUCTIVE SHEET AND EMBOSSED CARRIER TAPE

TECHNICAL FIELD

The present invention relates to a conductive sheet and an embossed carrier tape formed by embossing the conductive sheet, and more particularly relates to a conductive sheet and an embossed carrier tape which are utilized for, for example, mounting (also referred to as "packaging" or "housing"), storing, and transporting ICs, LSIs, and other electronic components.

BACKGROUND ART

Conventionally, as a container for mounting ICs, LSIs, and other electronic components, embossed carrier tapes or the like are widely known. This embossed carrier tape is formed by embossing a synthetic resin sheet. Here, as a container for mounting electronic components, a sheet in which a certain level of conductivity is imparted to the above-described synthetic resin sheet, or a sheet to which an antistatic effect is imparted have been used for preventing electrostatic breakdown of electronic components to be mounted. As a material for such a conductive sheet, a sheet in which carbon black is dispersed in polystyrene-based resin is widely known. Hereinafter, conventional examples of a conductive sheet formed by dispersing carbon black in polystyrene-based resin are described in Patent Documents 1 and 2.

Patent Document 1 describes, as an object, "to provide a conductive composite plastic sheet in which a burr or the like does not occur on the slit surface particularly when the sheet is slit, and a conductive plastic container (see, paragraph [0006]), the conductive composite plastic sheet including a sheet substrate containing (A-1) one or more thermoplastic resins selected from polyphenylene ether resins and polystyrene-based resins; (A-2) one or more selected from thermoplastic resins and thermoplastic elastomers which are incompatible with the above-described thermoplastic resin and do not contain a styrene unit as a repeating unit; and a conductive resin layer formed on the surface of the sheet substrate, in which the sheet substrate contains a substance obtained by blending 1 to 20 parts by mass of a component (A-2) per 100 parts by mass of a component (A-1); the conductive resin layer is a layer composed of a conductive resin composition containing one or more selected from (B) one or more thermoplastic resins selected from polyphenylene ether resins and polystyrene-based resins, (C) carbon black, and (D) thermoplastic elastomers; the thickness ratio of the sheet substrate and the conductive resin layer is in a range of 4/1 to 20/1; and the total thickness of the conductive composite plastic sheet is in a range of 0.1 to 1.0 mm (see, "claim 1").

Further, Patent Document 2 describes that "a sheet in which carbon black is simply dispersed in polystyrene-based resin exhibits a favorable antistatic effect, but mechanical strength such as impact resistance and pocket strength when the sheet is formed into an embossed carrier tape are insufficient" (see, paragraph [0003]). Patent Document 2 also describes, as an object, "to provide a surface conductive composite plastic sheet having excellent pocket strength, formability and the like when being formed into an embossed carrier tape even in a case where the sheet is processed into embossed carrier tapes having various shapes, by laminating a sheet substrate layer formed from a specific thermoplastic resin composition and a surface conductive layer having conductivity" (see, paragraph [0004]), "the surface conductive composite plastic sheet being obtained by laminating a surface conductive layer on both surfaces of a sheet substrate layer formed from thermoplastic resins which are polystyrene-based resins and/or ABS resins or polymer alloys thereof, in which the surface resistance value is $1\times10^3\Omega/$ or more and less than $1\times10^{10}\Omega/$, the tensile modulus of the sheet substrate layer is 1,350 MPa or less, the tensile modulus of the surface conductive layer is greater than the tensile modulus of the sheet substrate layer, and the pocket strength is 93.3 N or more (see "claim 1").

CITATION LIST

Patent Documents

Patent Document 1: JP-A-2004-255774
Patent Document 2: JP-B-4047659

SUMMARY OF THE INVENTION

Problems to be Solved by the Invention

Here, there is a problem that, when an electronic component is mounted on an embossed carrier tape formed by embossing a conductive sheet in which carbon black is dispersed in polystyrene-based resin, a friction between the electronic component and a surface portion of the side wall or the bottom of an embossed pocket, which is in contact with the electronic component, causes detachment of carbon black on the surface portion, thus contaminating the electronic component. However, the above-described Patent Documents 1 and 2 do not describe anything about the problem of detachment of carbon black and a solution thereof.

Further, when an attempt is made to solve only reduction in detachment of carbon black, an adverse side effect may occur such as deterioration of physical properties of an embossed carrier tape formed by processing a conductive sheet, for example, buckling strength, which is an important parameter of the physical properties. Note that buckling strength is generally tested in a state in which a conductive sheet is processed to be formed into an embossed carrier tape. The detachment of carbon black is tested in a state of an embossed carrier tape or in a state of a conductive sheet.

Further, in a conductive sheet which includes the invention described in Patent Documents 1 and 2 and which is obtained by laminating a substrate layer and a surface layer having conductivity, a plurality of types of resins are used in combination for resin used for the substrate layer and resin used for the surface layer respectively. The type and compounding ratio of resin to be combined is generally different between the substrate layer and the surface layer. When the type and compounding ratio of resin to be combined is different, there is a possibility that management of the production process and quality control become complicated, and reduction in production costs becomes difficult.

Thus, an object of the present invention is to provide a conductive sheet and an embossed carrier tape that can reduce detachment of carbon black and prevents deterioration of buckling strength.

Another object of the present invention is to provide a conductive sheet and an embossed carrier tape prepared by using a common material, in which the type of combination and compounding ratio of resin (particularly, polystyrene-based resin) used for a core layer (substrate layer) and a surface layer having conductivity are made common.

Solutions to the Problems

To achieve the above-described object, the invention according to claim 1 is a conductive sheet for an embossed carrier tape for mounting an electronic component, in which the conductive sheet has a configuration in which a surface layer having conductivity is laminated on at least one surface of a core layer; the core layer and the surface layer each contain a common material constituted of only a combination of three types of polystyrene-based resins of styrene-butadiene copolymer resin, general purpose polystyrene resin, and high impact polystyrene resin; a common material constituting the core layer and a common material constituting the surface layer have the same compounding ratio; the surface layer is formed by kneading carbon black in the common material; and the compounding ratio of the common material is such that the styrene-butadiene copolymer resin is 35% by weight, and the high impact polystyrene resin is 10% by weight to 15% by weight when the entire common material is 100% by weight.

Further, the invention according to claim 2 is a conductive sheet for an embossed carrier tape for mounting an electronic component, in which the conductive sheet has a configuration in which a surface layer having conductivity is laminated on at least one surface of a core layer; the core layer and the surface layer each contain a common material constituted of only a combination of three types of polystyrene-based resins of styrene-butadiene copolymer resin, general purpose polystyrene resin, and high impact polystyrene resin; a common material constituting the core layer and a common material constituting the surface layer have the same compounding ratio; the surface layer is formed by kneading carbon black in the common material; and the compounding ratio of the common material is such that the styrene-butadiene copolymer resin is 35% by weight, the high impact polystyrene resin is 10% by weight to 15% by weight, and the general purpose polystyrene resin is 50% by weight to 55% by weight when the entire common material is 100% by weight.

Further, the invention according to claim 3 is an embossed carrier tape formed by processing the conductive sheet according to claim 1 or 2 to form an embossed pocket.

Effects of the Invention

According to the conductive sheet and embossed carrier tape of the present invention, provided are significant effects of remarkably reducing detachment of carbon black and preventing deterioration of buckling strength when being used for a container to be mounted on electronic components or the like.

Further, according to the conductive sheet and embossed carrier tape of the present invention, the combination of type of resins used for a core layer and the combination of type of resins used for a surface layer having conductivity are made common, and the compounding ratios thereof are also made common. Thus, management of the production process and quality control are simplified, so that a significant effect of reducing production costs can be provided.

DESCRIPTION OF EMBODIMENTS

Figure 1:
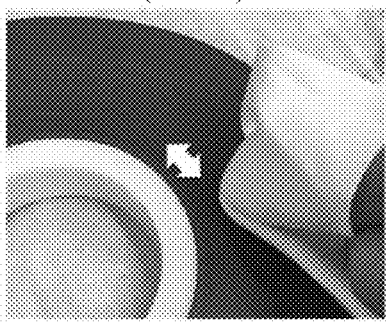
FIG. 1 shows an evaluation result of detachment of carbon on the slit surface (cut surface of conductive sheet) of an embossed carrier tape.
Figure 1:
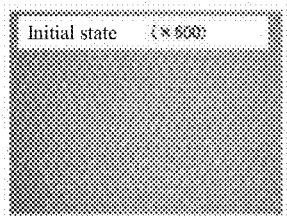
Figure 1:
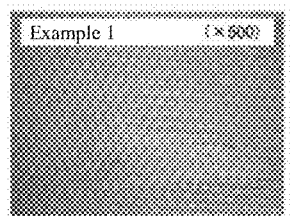
Figure 1:
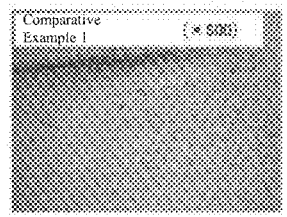
Figure 1:
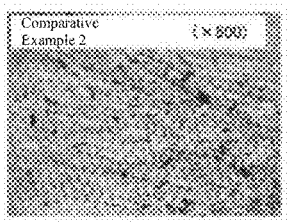
Figure 1:
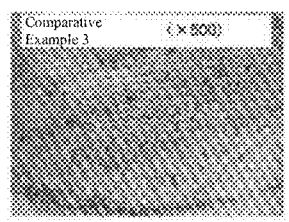

Hereinafter, the present invention will be further described in more detail using preferred embodiments. Note that the following embodiments are merely examples that embody the present invention, and the present invention is not limited thereto.

The conductive sheet of the present invention is formed by laminating a core layer (also referred to as "substrate layer") and a surface layer (also referred to as "conductive layer"). The surface layer may be laminated on one surface of the core layer, or may be laminated on both surfaces of the core layer. In the present invention, a plurality of polystyrene-based resins are used in combination, and the combination of type of polystyrene-based resins used in the core layer and the combination of type of polystyrene-based resins used in the surface layer are made common. This combination of polystyrene-based resins commonly used is defined as a common material. This is because there is a possibility that changing the type of material to be used between the core layer and the surface layer involve complicated quality control of the material, increase in material costs, and increase in the production process. In light of this, the applicant of the present application studied so as to use common materials and compounding ratios for the core layer and the surface layer as much as possible. As a result of the study, the applicant of the present application found using, as the common material, a combination of styrene-butadiene copolymer resin, general purpose polystyrene resin (also referred to as "GPPS"), and high impact polystyrene resin (also referred to as "HIPS"). Styrene-butadiene copolymer resin, general purpose polystyrene resin, and high impact polystyrene resin are each a publicly known material. The applicant of this invention realized reduction in detachment of carbon black and prevention of deterioration of buckling strength in an embossed carrier tape formed by processing a conductive sheet, by combining these three materials and optimizing the compounding ratio of the common material. Incidentally, it is known that styrene-butadiene copolymer resin and high impact polystyrene resin contain a rubber component, and general purpose polystyrene resin does not contain a rubber component.

Firstly, the surface layer will be described. The surface layer is formed by kneading carbon black as a common material. Specifically, the materials used for the surface layer are three types of styrene-butadiene copolymer resin, general purpose polystyrene resin, and high impact polystyrene resin as a common material, and one type of carbon black, which are only total four types of materials. As carbon black, one is selected from carbon blacks widely known as a conductive filler, such as furnace black, channel black, acetylene black, and Ketjen black. As the carbon black of the present invention, those having a particle size of 20 to 50 nm, that is, micro carbons are used. In the present invention, reduction in detachment of carbon black in a conductive sheet and an embossed carrier tape formed by adding carbon black could be realized by selecting these three types of polystyrene-based resins as a common material.

In the invention of the present application, the compounding ratios of styrene-butadiene copolymer resin, general purpose polystyrene resin (also referred to as "GPPS"), and high impact polystyrene resin (also referred to as "HIPS") used as a common material were individually studied and evaluated for core layer and surface layer. Firstly, the first object of the invention of the present application is to reduce detachment of carbon black of the conductive sheet. Further, if detachment of carbon black of the conductive sheet can be reduced, detachment of carbon black of an embossed carrier tape formed by embossing the conductive sheet can also be reduced. To achieve this object, the applicant of this application conducted diligent research and focused on using, as a combination of polystyrene resins, firstly, styrene-butadiene copolymer resin, general purpose polystyrene resin (also referred to as "GPPS"), and high impact polystyrene resin (also referred to as "HIPS"). Then, the applicant of the present application sets the compounding ratio such that styrene-butadiene copolymer resin is 35% by weight, and high impact polystyrene resin is 15% by weight or less when the entire common material (total of styrene-butadiene copolymer resin and general purpose polystyrene resin, and high impact polystyrene resin) is 100% by weight, and thus realized reduction in detachment of carbon of a conductive sheet formed by kneading carbon black in this common material to form a surface layer, and laminating this surface layer and a core layer formed from the above-described common material. Note that in the formation of the conductive sheet, when the entire surface layer is 100% by weight, approximately 10% by weight of carbon black is added and kneaded. Therefore, the compounding ratios of the common material of the surface layer in a state of a conductive sheet are respectively expressed by 90% of the above-described numerical value. That is, carbon black is 10% by weight; styrene-butadiene copolymer resin is 31.5% by weight; and high impact polystyrene resin is 13.5% by weight or less in the surface layer. According to this result, it can be said that an effect of reducing detachment of carbon can be exhibited in the case of not containing high impact polystyrene resin (0% by weight).

Then, the core layer will be described. In addition to the result of the study on the common material of the surface layer described above, in view of the purpose of using common type of resins and compounding ratios for the surface layer and the core layer, the compounding ratio of the common material of the core layer not containing carbon black may be set such that: styrene-butadiene copolymer resin is 35% by weight; and high impact polystyrene resin is 15% by weight or less when the entire common material (total of styrene-butadiene copolymer resin, general purpose polystyrene resin, and high impact polystyrene resin) is 100% by weight.

However, when only styrene-butadiene copolymer resin and general purpose polystyrene resin are used for the common material of the core layer, the core layer becomes hard. As a result, when the conductive sheet is embossed to form embossed pockets of the embossed carrier tape, the thickness of the side wall of the embossed pocket becomes uneven, resulting in a side wall locally having sites with a small thickness. When the side wall of the embossed pocket becomes thinner, a problem arises that buckling strength deteriorates. That is, to maintain a certain level of buckling strength of the embossed carrier tape, the embossed carrier tape (conductive sheet) needs to have a certain level of softness by adding high impact polystyrene resin containing a rubber component. On the contrary, when the embossed carrier tape is too soft, buckling strength naturally deteriorates.

Thus, as a result of diligent research, the applicant of this application found that, to prevent deterioration of buckling strength of the embossed carrier tape, it is necessary to set the compounding ratio of the common material of the core layer such that high impact polystyrene resin is 10% by weight to 20% by weight when the entire common material (total of styrene-butadiene copolymer resin, general purpose polystyrene resin, and high impact polystyrene resin) is 100% by weight, and the styrene-butadiene copolymer resin is 35% by weight. When the high impact polystyrene resin is less than 10% by weight, the core layer becomes too hard, and thus the buckling strength of the embossed carrier tape deteriorates as described above. When the high impact polystyrene resin is greater 20% by weight, the core layer becomes too soft (that is, the side wall of the embossed pocket becomes too soft), and thus buckling strength of the embossed carrier tape deteriorates. In general, general purpose polystyrene resin, which does not contain a rubber component, is very hard whereas styrene-butadiene copolymer resin and high impact polystyrene resin, which contain a rubber, are soft. The molecular diameter of rubber of styrene-butadiene copolymer resin is extremely smaller than the molecular diameter of rubber of high impact polystyrene resin, it is therefore known that styrene-butadiene copolymer resin is softer than high impact polystyrene resin.

That is, when the entire common material is 100% by weight, if the compounding ratio of three polystyrene-based resins contained in the common material is set such that: styrene-butadiene copolymer resin is 35% by weight, and high impact polystyrene resin is 10% by weight to 15% by weight; preferably, styrene-butadiene copolymer resin is 35% by weight, high impact polystyrene resin is 10% by weight to 15% by weight, and general purpose polystyrene resin is 50% by weight to 55% by weight, a conductive sheet and an embossed carrier tape that exhibit less detachment of carbon black and no deterioration of buckling strength can be produced even when the core layer and the surface layer are formed using the same compounding ratio. Note that, as described above, when the entire surface layer is 100% by weight, 10% by weight of carbon black is added in order to impart conductivity to the surface layer. At this time, the entire common material increases due to addition of the weight of carbon black. In the above-described preferred example, the compounding ratio of the common material is thus expressed as follows: styrene-butadiene copolymer resin is 31.5% by weight; high impact polystyrene resin is 9% by weight to 13.5% by weight; and general purpose polystyrene resin is 45% by weight to 49.5% by weight.

As such, reduction in detachment of carbon of the conductive sheet and prevention of decrease in buckling strength of the embossed carrier tape could be achieved by using, as a common material, common type of combination of a plurality of polystyrene-based resins to be used for the core layer and the surface layer of the conductive sheet, optimizing a compounding ratio of the common material, and using the optimized compounding ratio as a common compounding ratio for the core layer and the surface layer.

EXAMPLES

As Examples, an example is shown in which a surface layer having a thickness of 0.01 mm is laminated on both surfaces of a core layer having a thickness of 0.38 mm to form a conductive sheet having a thickness of 0.4 mm. As a common material, styrene-butadiene copolymer resin, general purpose polystyrene resin, and high impact polystyrene resin were used. Each of resins of the common material was pelletized, the resin was kneaded by a mixer, and a conductive sheet was formed using a known apparatus such as a twin screw extruder. In the surface layer, carbon black was added to the common material. The formed conductive sheet was wound once, then cut into a predetermined width, heated at a predetermined temperature. The sheet was pressed with upper and lower dies to form embossed pockets. Then, holes for sprockets were opened, and the sheet was finally wound on the reel. In addition to the press forming of this example, formation of the embossed pocket include compressed-air forming, and vacuum rotary forming and the like, which are all known techniques.

Table 1 shows the compounding ratio of the common material and the evaluation result of detachment of carbon black. Evaluation of detachment of carbon black was performed by a commonly used a general tester of dyeing fastness to rubbing in accordance with the standards of dyeing fastness test method (JIS L-0849). A plurality of conductive sheets each cut into a size of 24 mm×250 mm were pressed with a cotton cloth by applying a load of 200 g, and the cotton cloth was reciprocated 300 times and 500 time. Then, carbon black attached to the cotton cloth was read by a scanner, white and black binarization was performed using a personal computer, and the number of black dots were counted. A larger number of black dots counted indicates a larger detachment of carbon black. Note that such a test may also be referred to as a Gakushin friction test.

In Table 1, evaluation of detachment of carbon black is performed for three conductive sheets with different compounding ratios of the common material. In Table 1, in Reference Example 1, the compounding ratio of the common material of the surface layer is such that styrene-butadiene copolymer resin is 35% by weight, high impact polystyrene resin is 20% by weight, and general purpose polystyrene resin is 45% by weight when the entire common material is 100% by weight. In Example 1, the compounding ratio of the common material of the surface layer is such that styrene-butadiene copolymer resin is 35% by weight, high impact polystyrene resin is 15% by weight, and general purpose polystyrene resin is 50% by weight when the entire common material is 100% by weight. In Example 2, the compounding ratio of the common material is such that styrene-butadiene copolymer resin is 35% by weight, high impact polystyrene resin 0% by weight, and general purpose polystyrene resin is 65% by weight when the entire common material of the surface layer is 100% by weight. Note that 10% by weight (based on 100% by weight of the entire surface layer) of carbon black is added to the common material in the surface layer. Thus, % by mass of each polystyrene-based resin constituting the common material is each converted to a numerical value multiplied by 0.9 in terms of the surface layer. Note that the numerical values of the compounding ratio of the core layer is the same as those of the common material of the surface layer. Table 3 shows indication in terms of % by weight (wt. %) and indication in terms of part by weight of each of the common material (same as the core layer) and the surface layer (carbon black is added to the common material).

As shown in Table 1, after 500 reciprocations, 1184 black dots are counted in Reference Example 1; 770 black dots are counted in Example 1; and 15 black dots are counted in Example 2. Here, the applicant of this application confirms that, in an embossed carrier tape formed by using a conductive sheet in which the number black dots is 1,000 or less after 500 reciprocations, the degree of detachment of carbon black is favorable. Thus, according to the present example, it can be said that, when the compounding ratio of the common material is set such that styrene-butadiene copolymer resin is 35% by weight and high impact polystyrene resin is 15% by weight or less, detachment of carbon black can be reduced.

Table 1 shows evaluation of carbon detachment on the surface of the conductive sheet (corresponding to the surface of the embossed carrier tape). FIG. 1 shows the evaluation result of carbon detachment on the slit surface of the embossed carrier tape (cut surface of the conductive sheet). Detachment of carbon was evaluated by rubbing the slit surface of an embossed carrier tape with a waste cloth and checking the degree of transfer of carbon to the waste cloth by a microscope at a magnification of 500 times. As shown in FIG. 1, compared to the waste cloth in the initial state, almost no carbon transfer is observed in Example 1, whereas carbon transfer is observed in Comparative Examples 1 to 3. Note that, Comparative Examples 1 to 3 are commercially available products having a sheet thickness, sheet width, embossed carrier tape size, pocket size, pocket pitch, and the like which are equivalent to those of Example 1.

Further, the test of buckling strength of an embossed carrier tape formed by embossing a conductive sheet was conducted. As a tester, a commercially available force gauge (also referred to as "push-pull gauge") was used. Similarly to the evaluation of detachment of carbon black, the buckling strength test of an embossed carrier tape formed by using a conductive sheet, in which styrene-butadiene copolymer resin is 35% by weight, and the compounding ratio of high impact polystyrene resin and general purpose polystyrene resin were changed, was conducted. As a result, it was confirmed that the buckling strength was favorable in the range where high impact polystyrene resin was 10% by weight to 20% by weight. At that time, general purpose polystyrene resin was 45% by weight to 55% by weight. An example is exemplified in which when the entire common material of the core layer is 100% by weight, styrene-butadiene copolymer resin is 35% by weight, high impact polystyrene resin is 15% by weight, and general purpose polystyrene resin is 50% by weight. In the surface layer, when the entire surface layer is 100% by weight, 10% by weight of carbon black is added to the common material.

On the basis of this result, in a case where the common material constituted of a combination of the same type of resins and the same compounding ratio are used for the core layer and the surface layer, when the resin constituting the common material is a combination of three polystyrene-based resins of styrene-butadiene copolymer resin, high impact polystyrene resin, and general purpose polystyrene resin, and styrene-butadiene copolymer resin is 35% by weight, high impact polystyrene resin is 10% by weight to 15% by weight, and general purpose polystyrene resin is 50% by weight % to 55% by weight when the entire common material is 100% by weight, a remarkable effect of reducing detachment of carbon black of the conductive sheet and the embossed carrier tape and preventing deterioration of buckling strength of the embossed carrier tape can be provided.

Figure 3:
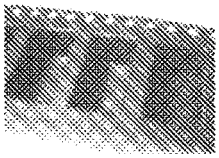
FIG. 3 shows a comparison result of buckling strength.
Figure 3:
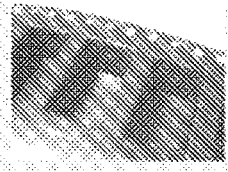
Figure 3:
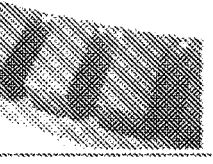
Figure 3:
Figure 3:
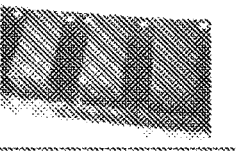
Figure 3:

FIG. 3 shows the comparison result of the buckling strength. The appearance of the front and back does not change in Comparative Examples 1 and 2, and Example 1, but the buckling strength in Example 1 is more excellent than those of Comparative Examples 1 and 2.

Figure 4:
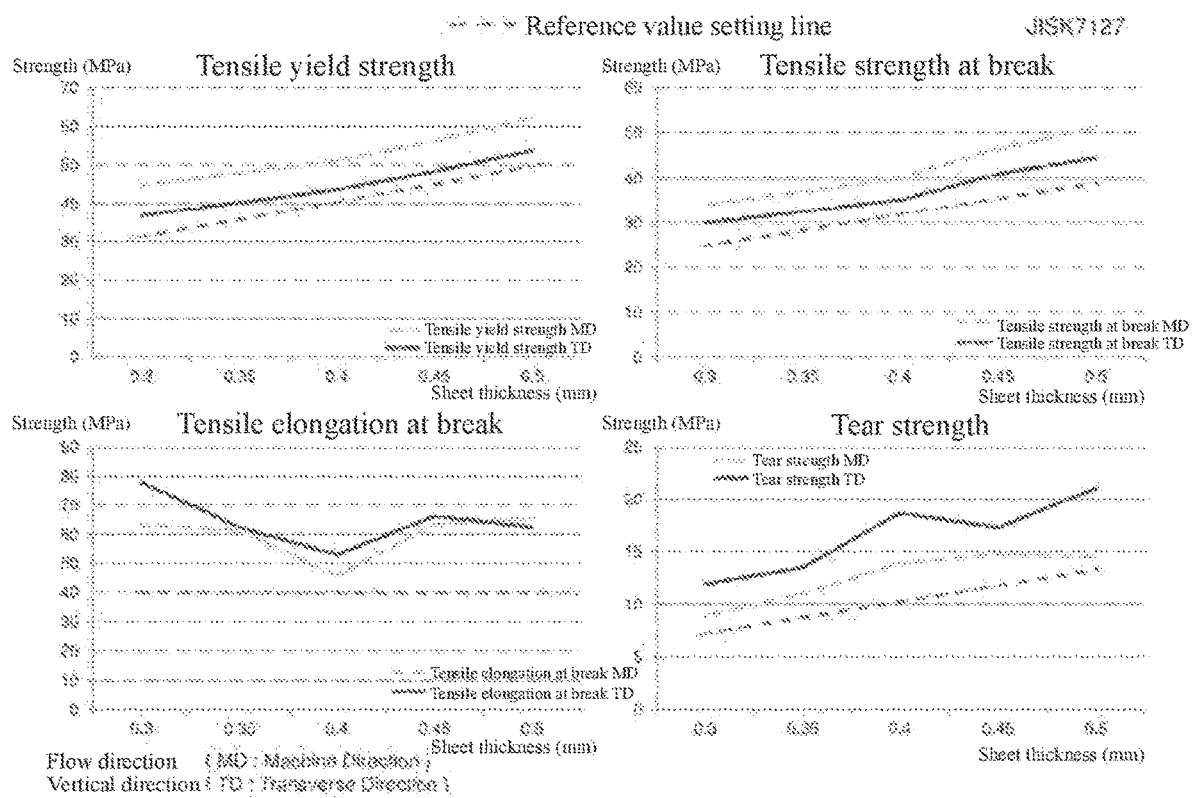
FIG. 4 shows test results of tensile yield strength, tensile strength at break, tensile elongation at break, and tear strength of a conductive sheet relative to a sheet thickness.

FIG. 4 shows an evaluation result of the physical properties other than buckling strength for the conductive sheet of the present invention. FIG. 4 shows test results of the tensile yield strength, the tensile strength at break, the tensile elongation at break, and the tear strength of the conductive sheet relative to the sheet thickness. The reference setting line for all the items of the physical properties was cleared in the conductive sheet thickness of 0.3 mm to 0.5 mm. Note that the thickness of the surface layer is 0.01 mm for one surface, and 0.02 mm for both surfaces regardless of the thickness of the conductive sheet. The case where the sheet thickness is 0.4 mm (core layer thickness: 0.38 mm, both surface layer thickness: 0.02 mm) corresponds to Example 1.

Table 2 shows a comparative result of the case where the sheet thickness is 0.4 mm, that is, a comparative result as to Example 1. As shown in Table 2, for the items of the tensile strength yield point, the tensile strength at break, and tear strength, Example 1 is more excellent than Comparative Examples 1 to 3, and for other items, Example 1 and Comparative Examples 1 to 3 have equivalent characteristics.

Figure 2:
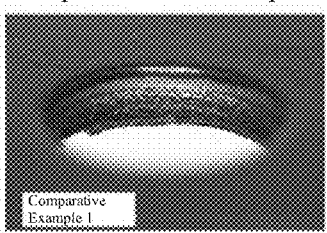
FIG. 2 shows a comparative result of an opening state of a hole for a sprocket formed in an embossed carrier tape.
Figure 2:
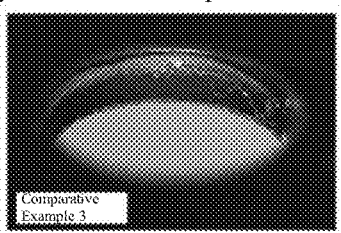
Figure 2:
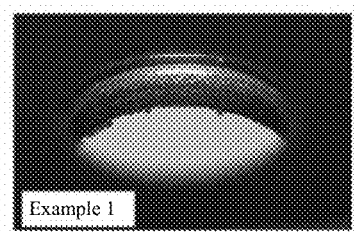

FIG. 2 shows a comparative result of an opening state of a hole for a sprocket formed in an embossed carrier tape. In Comparative Example 1, a crown-like burr occurs, in Comparative Example 3, a fibrous burr occurs, but Example 1 is in a favorable condition.

TABLE 1

Evaluation result of carbon black detachment
(Measurement result of number of black dots after binarization in fastness to rubbing test)

| | Resin type | Compounding ratio of common materials (wt %) | Number of dots after 500 reciprocations (number) | Number of dots after 300 reciprocations (number) |
|---|---|---|---|---|
| Reference | Styrene-butadiene copolymer resin | 35 | 1184 | 477 |
| Example 1 | General purpose polystyrene resin | 45 | | |
| | High impact polystyrene resin | 20 | | |
| Example 1 | Styrene-butadiene copolymer resin | 35 | 770 | 252 |
| | General purpose polystyrene resin | 50 | | |
| | High impact polystyrene resin | 15 | | |
| Example 2 | Styrene-butadiene copolymer resin | 35 | 15 | 6 |
| | General purpose polystyrene resin | 65 | | |
| | High impact polystyrene resin | 0 | | |

TABLE 4

Comparison result of physical property 0.4 mm-thick sheet

| Item | Unit | Comparative Example 1 | Comparative Example 2 | Comparative Example 3 | Example 1 |
|---|---|---|---|---|---|
| Monolayer/multilayer | — | 2 type/3 layer | 2 type/3 layer | 2 type/3 layer | 2 type/3 layer |
| Surface layer | — | Conductive PS resin | Conductive PS resin | Conductive PS resin | Conductive PS resin |
| Core layer | — | PS resin | PS resin | PS resin | PS resin |
| Surface resistance value | Ω | $10^6$ | $10^{5-6}$ | $10^{4-6}$ | $10^{5-6}$ |
| Tensile strength yield point | MPa | 26~28 | 18~23 | 23.3 | 42~51 (2 times) |
| Tensile strength at break | MPa | 19~24 | 20~25 | 20.8 | 34~42 (1.5 times) |
| Elongation at break | % | 63.8~66.4 | 65~67 | 65.3 | 55~66 |
| Tear strength | MPa | 4.1~7.3 | 4~6.6 | 5.3~6.6 | 14~20 (2 times) |

PS: polysilicon

TABLE 5

% by weight and part by mass

| | | % by weight (wt. %) | | Part by weight | |
|---|---|---|---|---|---|
| | Type | Common material/ core layer | Surface layer | Common material/ core layer | Surface layer |
| Reference | Carbon black | 0 | 10 | 0 | 32 |
| Example 1 | Styrene-butadiene copolymer resin | 35 | 31.5 | 100 | 100 |
| | General purpose polystyrene resin | 45 | 40.5 | 129 | 129 |
| | High impact polystyrene resin | 20 | 18 | 57 | 57 |
| | Total | 100 | 100 | 286 | 318 |

TABLE 5-continued

| | | % by weight and part by mass | | | |
|---|---|---|---|---|---|
| | | % by weight (wt. %) | | Part by weight | |
| | Type | Common material/ core layer | Surface layer | Common material/ core layer | Surface layer |
| Example 1 | Carbon black | 0 | 10 | 0 | 32 |
| | Styrene-butadiene copolymer resin | 35 | 31.5 | 100 | 100 |
| | General purpose polystyrene resin | 50 | 45 | 143 | 143 |
| | High impact polystyrene resin | 15 | 13.5 | 43 | 43 |
| | Total | 100 | 100 | 286 | 318 |
| Example 2 | Carbon black | 0 | 10 | 0 | 32 |
| | Styrene-butadiene copolymer resin | 35 | 31.5 | 100 | 100 |
| | General purpose polystyrene resin | 65 | 58.5 | 186 | 186 |
| | High impact polystyrene resin | 0 | 0 | 0 | 0 |
| | Total | 100 | 100 | 286 | 318 |

The invention claimed is:

1. A conductive sheet for an embossed carrier tape for mounting an electronic component, wherein
the conductive sheet has a configuration in which a surface layer having conductivity is laminated on at least one surface of a core layer;
the core layer and the surface layer each contain a common material constituted of only a combination of three types of polystyrene-based resins of styrene-butadiene copolymer resin, general purpose polystyrene resin, and high impact polystyrene resin;
a common material constituting the core layer and a common material constituting the surface layer have the same compounding ratio;
the surface layer is formed by kneading carbon black in the common material; and
the compounding ratio of the common material is such that the styrene-butadiene copolymer resin is 35% by weight, and the high impact polystyrene resin is 10% by weight to 15% by weight when the entire common material is 100% by weight.

2. A conductive sheet for an embossed carrier tape for mounting an electronic component, wherein
the conductive sheet has a configuration in which a surface layer having conductivity is laminated on at least one surface of a core layer;
the core layer and the surface layer each contain a common material constituted of only a combination of three types of polystyrene-based resins of styrene-butadiene copolymer resin, general purpose polystyrene resin, and high impact polystyrene resin;
a common material constituting the core layer and a common material constituting the surface layer have the same compounding ratio;
the surface layer is formed by kneading carbon black in the common material; and
the compounding ratio of the common material is such that the styrene-butadiene copolymer resin is 35% by weight, the high impact polystyrene resin is 10% by weight to 15% by weight, and the general purpose polystyrene resin is 50% by weight to 55% by weight when the entire common material is 100% by weight.

3. An embossed carrier tape formed by processing the conductive sheet according to claim 1 to form an embossed pocket.

4. An embossed carrier tape formed by processing the conductive sheet according to claim 2 to form an embossed pocket.

* * * * *